United States Patent [19]
Decker et al.

[11] Patent Number: 6,034,178
[45] Date of Patent: Mar. 7, 2000

[54] COATING POWDER FOR HIGH TEMPERATURE RESISTANT COATINGS

[75] Inventors: Owen H. Decker, Wyomissing; Charles P. Tarnoski, Sinking Spring, both of Pa.

[73] Assignee: Morton International, Inc., Chicago, Ill.

[21] Appl. No.: 09/163,962

[22] Filed: Sep. 30, 1998

[51] Int. Cl.[7] .................................................. C08L 83/06
[52] U.S. Cl. ........................ 525/101; 525/106; 525/110; 525/934; 524/904; 524/506; 528/25
[58] Field of Search ................................... 525/101, 106, 525/110, 934; 524/904; 528/25

[56] References Cited

U.S. PATENT DOCUMENTS

| | | | |
|---|---|---|---|
| 4,419,477 | 12/1983 | Saeki et al. | 524/904 |
| 4,879,344 | 11/1989 | Woo et al. | 525/100 |
| 5,422,396 | 6/1995 | Daly et al. | 525/106 |
| 5,962,568 | 10/1999 | Decker et al. | 524/440 |

*Primary Examiner*—Tae Yoon
*Attorney, Agent, or Firm*—Wayne E. Nacker; Gerald K. White

[57] ABSTRACT

A coating powder for producing a high temperature resistant coating has a resin system which comprises (A) between about 50 and about 93 wt % based on total of (A) plus (B) of a silicone resin and (B) between about 7 and about 50 wt % based on total weight of (A) plus (B) of a polyhydroxyl component. The silicone resin (A) of the coating powder has organic substitutents selected from the group consisting of phenyl, methyl, $C_2$ through $C_6$ alkyl and mixtures thereof. The silicone resin has a viscosity of between about 500 and about 10,000 cps at 150° C., a condensable hydroxyl content of between about 2 and about 4.5 wt %, and a glass transition temperature ($T_g$) of about 55° C. or above. The silicone resin preferably contains about 0.2% or less of organic solvents. The polyhydroxyl component (B) is a polyhydroxyl compound or blends of polyhydroxyl compounds with average hydroxyl equivalent weight of between 100 and 500, containing an average of at least three hydroxyl groups per molecule, and of number average molecular weight between 300 and 20,000. The blend of the silicone resin (A) and polyhydroxyl component (B) should have a combined glass transition temperature ($T_g$) of at least about 50° C.

11 Claims, No Drawings

COATING POWDER FOR HIGH TEMPERATURE RESISTANT COATINGS

The present invention is directed to coating powder for producing coatings that are resistant to high temperatures, particularly to silicone-based coating powders having improved adhesion to substrates.

BACKGROUND OF THE INVENTION

U.S. patent application Ser. No. 09/052,664, now U.S. Pat. No 5,962,568, describes a coating powder based on 100% silicone as the binder system. The silicone resin described therein is particularly formulated for use in a coating powder.

Because silicone polymers are stable above 600° F. (315° C.) where carbon polymers decompose, the binders of current high temperature powder coatings contain a maximum of silicone resins. For example, the binder of coating Mor-Temp Stove Black 99-7020 contains 97.3% silicone resin and 2.7% of various organic compounds, including curing agents, flow modifiers and degassing aids. While such coatings have reasonable adhesion to substrates such as aluminum after exposure to temperatures above 600° F., their adhesion to ferrous substrates is poor after exposure to these temperatures.

Many articles which could potentially be coated with a high temperature powder coating are fabricated from low-carbon steel. Examples are exhaust system components for automotive and non-automotive engines of all sizes, stoves, heaters, barbecue grill and grill components. The adhesion of current silicone systems is not adequate for these applications. Accordingly, the invention is directed to powder coatings which provide a high-temperature coating with improved adhesion to ferrous substrates.

Herein it is found that the addition of a polyhydroxyl component improves adhesion of silicone-based coating powders to ferrous substrates.

SUMMARY OF THE INVENTION

In accordance with the present invention, a coating powder for producing a high temperature resistant coating has a resin system which comprises (A) between about 50 and about 93 wt % based on total of (A) plus (B) of a silicone resin and (B) between about 7 and about 50 wt % based on total weight of (A) plus (B) of a polyhydroxyl component. Preferably the coating powder contains at least about 10 wt % of the polyhydroxyl component (B).

The silicone resin (A) of the coating powder has organic substitutents selected from the group consisting of phenyl, methyl, $C_2$ through $C_6$ alkyl and mixtures thereof. The silicone resin has a viscosity of between about 500 and about 10,000 cps at 150° C., preferably 2000 to 5000 cps. The silicone resin has a condensable hydroxyl content of between about 2 and about 4.5 wt %, preferably from about 2 to about 3 wt. %. The silicone resin has a glass transition temperature ($T_g$) of about 55° C. or above, preferably about 60° C. or above. The silicone resin preferably contains about 0.2% or less of organic solvents, more preferably about 0.1% or less.

The polyhydroxyl component (B) is a polyhydroxyl compound or blends of polyhydroxyl compounds with average hydroxyl equivalent weight of between 100 and 500, containing an average of at least three hydroxyl groups per molecule, and of number average molecular weight between 300 and 20,000, preferably between 400 and 2000.

The blend of the silicone resin (A) and polyhydroxyl component (B) should have a combined glass transition temperature ($T_g$) of at least about 50° C., preferably of at least about 60° C.

DETAILED DESCRIPTION OF CERTAIN PREFERRED EMBODIMENTS

Herein, unless otherwise noted, all percentages are by weight. The total of the binder resins, i.e., the silicone resin (A) plus the polyhydroxyl component (B), is expressed as 100 wt %; other components of coating powders such as fillers, pigments, flow control agents, cure catalysts, etc. are expressed as parts per hundred parts resin (phr) by weight.

The silicone resin used in the coating powders has a unique set of physical parameters which are found to be necessary for formulating a coating powder that forms an excellent high temperature resistant coating.

The above-recited viscosity parameters are required for appropriate melt-flow of the molten coating powder at the temperatures whereat the coating powder is fused and cured.

The lower limits of $T_g$ recited above are necessary to prevent undue blocking of the coating powder. The tendency of a powder coating to sinter or block is an important measure of its commercial value. Minor blocking is normal for coating powders. A tendency to excessively block can make cold storage, shipping, and handling necessary. Badly blocked powder is useless and must be discarded. Blocking is measured by weighting a 1" diameter cylinder of powder 1 inch (2.54 cm) deep with 100 grams at 110° F. (43° C.) for 24 hours and evaluating the difficulty of breaking the sample back into usable powder.

A smooth or lightly textured appearance is desirable for high temperature coatings. Bubbles caused by outgassing of water and organic solvent mar the appearance of a coating. Very rough films are usually not continuous, nullifying their usefulness as protective barriers.

The condensable hydroxyl content of the silicone resin must not be too high. Otherwise, too much water outgasses during curing of the coating powder, resulting in a foamy appearance of the coating. On the other hand, the lower end of the condensable hydroxyl content range is important because below this the coating powder will not cure or will cure too slowly to be suitable for commercial applications. The gel time of a coating powder is a measure of how fast crosslinking reactions occur, usually measured on a horizontal plate at 400° F. (204° C.). Powders which take longer than 300 seconds to gel are generally not considered reactive enough to be commercially useful.

Most commercial silicone resins contain some residual organic solvent as a consequence of the process of silicone resin synthesis. Such organic solvent tends to be internally trapped within the silicone resin and is generally not removed when the silicone resin is melt blended with other components to form a coating powder composition. Herein, it is found that it is necessary to substantially remove such residual organic solvent. This is accomplished by melting the silicone resin and removing solvent from the molten resin, e.g., by sparging with a gas, such as nitrogen, or by vacuum.

Herein, a silicone resin in accordance with the invention was made by further polymerizing a commercial silicone resin, i.e., Dow Corning 6-2230. In a melt polymerization, residual solvents, absorbed water and water of condensation were removed by nitrogen sparging, yielding a resin with a glass transition temperature high enough to eliminate blocking problems. Fortunately, the resin also yields a desirable combination of low outgassing during cure, acceptable viscosity and fast cure speed when catalyzed properly.

Above-identified U.S. patent application Ser. No. 09/052,664 describes coating powders in which the resin system is 100% of the silicone resin described above. While such coating powders have the advantage of having no organic component, other than moieties which are part of the silicone resin, and while such resins adhere well to certain substrates, such as aluminum, the 100% silicone resins do not adhere as well to iron and steel substrates as may be commercially required. Accordingly, in accordance with the invention, it is found that combining the polyhydroxyl resin (B) with the silicone resin (A) in a coating powder produces a coating that adheres well to iron and steel.

Examples of suitable polyhydroxyl components include polyphenolic compounds, such as a cresol novalac, and polyhydroxystyrene. Some specific polyhydroxyl compounds are found in the table below:

| Component | Eq. Wt. (g/OH) | OH/ molecule | Molecular Wt. (Mn) |
|---|---|---|---|
| HT 9690/9490* | 113 | 4 | 450 |
| Polyhydroxystyrene | 120 | 100 | 12,000 |
| GT-7013** | 375 | 3.7 | 1400 |
| DEH 87*** | 197 | 3.9 | 770 |

*cresol novalac polyhydroxyl resin
**polyepoxy/polyhydroxyl resin
***diglycidyl ether of bisphenol A extended with additional bisphenol A A coating powder according to the invention may be filled or unfilled, clear or pigmented. In a filled coating powder, it is found desirable to employ at least 40 phr mica and/or calcium metasilicate. It may also be desirable to include at least about 10 phr zinc powder to impart corrosion resistance.

While silicone resin self-condenses at elevated temperatures, it is often desirable to employ a cure catalyst, such as zinc acetylacetonate, so as to achieve rapid gel time. Typically at least about 0.1 phr of such a cure catalyst is employed, up to about 2.0 phr. Other common additives include flow aids, pigments, etc.

Coating powders of the present invention are produced in a normal manner. The components are mixed and the mixture melt blended at a temperature somewhat above the melting point of the silicone resin. The composition is then cooled and fragmented to produce powder. The powder is then sorted according to size, particles between about 10 and about 100 microns in greatest dimension being desirable.

The coating powder is applied to a substrate in a normal manner, e.g., by electrostatic spraying. Then the coating powder is heated for a sufficient amount of time to fuse and cure the coating powder. High temperature coatings are applied, for example, to barbecue grills, automotive mufflers, oven parts, and the like.

The invention will now be described in greater detail by way of specific examples.

EXAMPLE A

Preparation of a Polysiloxane Polymer in Accordance with the Invention

To a stirred 50-liter glass kettle fitted with a nitrogen sparge and a still head was charged 45 kg of Dow Corning 6-2230 resin (melt viscosity 200 cP at 150° C.). The resin was melted and stirred at 165–175° C. until its viscosity reached 2500 cP, then discharged. The melt cooled to a clear, colorless, brittle resin with a viscosity of 2707 cP at 150° C. A total of 740 ml of distillate was collected, including 365 ml of water and 375 ml of organic solvents, mostly toluene. Analysis showed the resin to contain 2.3% hydroxyl groups. In contrast, a sample of Dow Corning 6-2230 resin contained 4.7% hydroxy groups. A differential scanning calorimeter (DSC) showed the sample to have a glass transition temperature of 63.6. Dow Corning 6-2230 resin was determined to have a glass transition temperature of approximately 50.2° C.

EXAMPLE B

Preparation of Polysiloxane Polymer in Accordance with the Invention

To a stirred 2-liter glass kettle fitted with a nitrogen sparge and a still head was charged 2 kg of Dow Corning Z-6018 resin (melt viscosity 750 cP at 150° C.). The resin was melted and stirred at 180° C. until its viscosity reached 4600 cP, then discharged. The melt cooled to a clear, colorless, brittle resin with a viscosity of 4625 cP at 150° C. A total of 21.5 ml of distillate was collected.

Key characteristics of silicone resin parameters according to the invention and actual parameters of the silicone resins of Examples A and B are compiled in Table A-B below:

TABLE A-B

| | Silicone Resins | | | | |
|---|---|---|---|---|---|
| Resin | Organic Substituents | Viscosity (cP at 150° C.) | OH Content (Wt. %) | $T_g$ (° C.) | Solvent Content (Wt. %) |
| Invention | methyl, phenyl, $C_2$–$C_6$ alkyl | 500–10,000 (2000–5000)* | 2.0–4.5 (2–3)* | >55 (>60)* | <0.2 (<0.1)* |
| Example A | methyl, phenyl | 2707 | 2.3 | 63.9 | <0.1 |
| Example B | propyl, phenyl | 4625 | 4.0 | 66.2 | <0.1 |

*preferred results in parentheses

TABLE 1

Black Compositions
Coating powders having the following compositions were prepared.

| Component | Description | Manufacturer | Comp. Ex. 1 (parts) | Ex. 1 (parts) | Ex. 2 (parts) | Comp. Ex. 2 (parts), |
|---|---|---|---|---|---|---|
| Morkote ® S-101 | Methylphenyl Silicone Resin | Morton International | 100 | 80 | 80 | 95 |
| HT 9690/9490 | Cresol Novolac Polyhydroxyl Resin | Ciba | — | 20 | — | 5 |
| Poly(4-hydroxy-styrene) | Polyhydroxyl Resin | Triquest LP | — | — | 20 | — |
| Nyad ® 325 | Wollastonite Filler | Nyco Corp. | 100 | 100 | 100 | 100 |
| Shepherd ® No. 1 Black Pigment | Copper Chromite Spinel Pigment | Shepherd Color Company | 30 | 30 | 30 | 30 |
| Resiflow ® P-67 | Flow Aid | Estron | 1.5 | 1.5 | 1.5 | 1.5 |
| Benzoin | Benzoin Degassing Aid | Estron | 0.8 | 0.8 | 0.8 | 0.8 |
| GCA-ZAA | Zinc(acac)$_2$ Catalyst | GCA Chemical Corp. | 0.5 | 0.5 | 0.5 | 0.5 |

The components were compounded, chilled, chipped, ground and sieved through a 140 mesh screen in the usual manner to prepare a black coating powder. The powder was electrostatically sprayed onto 0.032 inch-thick mild steel "Q" panels and cured at 450° F. for 15 minutes. Testing was performed on panels with coating thicknesses of 1.8 to 2.5 mils. the adhesion of the coating was tested using the crosshatch adhesion test (ASTM D 3359-87). Adhesion as a function of heat exposure was tested by baking coated panels in an air-circulating oven at 800° F. for 24 hours, then performing cross-hatch adhesion testing.

TABLE 2

Yellow Compositions were prepared containing the following components:

| Component | Description | Manufacturer | Comp. Ex. 3 (parts) | Ex. 3 (parts) | Ex. 4 (parts) | Ex. 5 (parts) | Ex. 6 (parts) | Comp. Ex. 4 (parts) |
|---|---|---|---|---|---|---|---|---|
| Morkote ® S-101 | Methylphenyl Silicone Resin | Morton International | 100 | 80 | 80 | 90 | 90 | 95 |
| HT 9690/9490 | Cresol Novolac Polyhydroxyl Resin | Ciba | — | 20 | — | — | — | — |
| Poly(4-hydroxy-styrene) | Polyhydroxyl Resin | Triquest LP | — | — | 20 | — | — | — |
| Araldite ® GT-7013 | Polyepoxy/Polyhydroxyl Resin | Ciba | — | — | — | 10 | — | — |
| DEH 87 | Polyhydroxyl Resin | Dow | — | — | — | — | 10 | 5 |
| Nyad ® 325 | Wollastonite Filler | Nyco Corp. | 50 | 50 | 50 | 50 | 50 | 50 |
| C-3000 | Mica Filler | KMG Minerals | 25 | 25 | 25 | 25 | 25 | 25 |
| Sicopal ® L 1110 Yellow | Bismuth Molybdate/Vanadate Pigment | BASF Corp. | 20 | 20 | 20 | 20 | 20 | 20 |
| Resiflow ® P-67 | Flow Aid | Estron | 1.5 | 1.5 | 1.5 | 1.5 | 1.5 | 1.5 |
| Benzoin | Benzoin Degassing Aid | Estron | 0.8 | 0.8 | 0.8 | 0.8 | 0.8 | 0.8 |
| GCA-ZAA | Zinc(acac)$_2$ Catalyst | GCA Chemical Corp. | 0.5 | 0.5 | 0.5 | 0.5 | 0.5 | 0.5 |

The yellow coating powders were prepared, coated, and the coatings tested as per the black coating powders.

TABLE 3

Performance of Blacks

| Characteristic or Test | Comp. Ex.1 | Ex. 1 | Ex.2 | Comp. Ex.2 |
|---|---|---|---|---|
| Crosshatch Adhesion (As-Cured) | 4B | 3B | 4B | 3B |
| Crosshatch Adhesion (After 24 h at 800) | 0B | 5B | 5B | 0B |
| Color (As-Cured) | Black | Black | Black | Black |
| Color (After 24 h at 800° F.) | Black | Dark Gray | Black | Black |
| Color Change ($\Delta E$) | 1.42 | 4.67 | 1.49 | 2.10 |

Key:
5B No flaking from cross-cut area.
4B Minor flaking from cross-cut area.
3B Moderate flaking from cross-cut area.
2B Substantial flaking from cross-cut area.
1B Severe flaking from cross-cut area.
0B Greater than 65% removal of coating from cross-cut area.

TABLE 4

Performance of Yellows

| Characteristic or Test | Comp. Ex. 3 | Ex. 3 | Ex. 4 | Ex. 5 | Ex. 6 | Comp. Ex. 4 |
|---|---|---|---|---|---|---|
| Crosshatch Adhesion (As-Cured) | 4B | 3B | 5B | 5B | 5B | 5B |
| Crosshatch Adhesion (After 24 h at 800) | 0B | 3B | 5B | 3B | 3B | 0B |
| Color (As-Cured) | Yellow | Brown | Dark Yellow | Yellow | Yellow | Yellow |
| Color (After 24 h at 800° F.) | Yellow | Yellow | Yellow | Yellow | Yellow | Yellow |
| Color Change ($\Delta E$) | 2.9 | 50 | 21 | 8.3 | 7.2 | 6.4 |

Key:
5B No flaking from cross-cut area.
4B Minor flaking from cross-cut area.
3B Moderate flaking from cross-cut area.
2B Substantial flaking from cross-cut area.
1B Severe flaking from cross-cut area.
0B Greater than 65% removal of coating from cross-cut area.

The most outstanding achievement of the present invention is the improved adhesion achieved at 800° F. exposure through the inclusion of the polyhydroxyl component (B).

What is claimed is:

1. A coating powder composition for producing a high temperature resistant coating comprising a resin system which comprises (A) between about 50 and about 93 wt % based on total of (A) plus (B) of a silicone resin and (B) between about 7 and about 50 wt % based on total weight of (A) plus (B) of a polyhydroxyl component.

said silicone resin (A) having organic substitutents selected from the group consisting of phenyl, methyl, $C_2$ through $C_6$ alkyl and mixtures thereof, said silicone resin having a viscosity of between about 500 and about 10,000 cps at 150° C., a condensable hydroxyl content of between about 2 and about 4.5 wt %, and a glass transition temperature ($T_g$) of about 55° C. or above, said polyhydroxyl component (B) being a polyhydroxyl compound or blends of polyhydroxyl compounds with average hydroxyl equivalent weight of between 100 and 500, containing an average of at least three hydroxyl groups per molecule, and of number average molecular weight between about 300 and about 20,000, the blend of said silicone resin (A) and said polyhydroxyl component (B) having a combined glass transition temperature ($T_g$) of at least about 50° C.

2. The composition according to claim 1 wherein said blend of silicone resin (A) and said polyhydroxyl component (B) has a combined glass transition temperature of at least about 60° C.

3. The composition according to claim 1 wherein said silicone resin contains about 0.2% or less of organic solvent.

4. The composition according to claim 1 wherein said silicone resin has a viscosity at 150° C. of between about 2000 and about 5000 cps.

5. The composition according to claim 1 wherein silicone resin has between about 2 and about 3 wt. % condensable hydroxyl content.

6. The composition according to claim 1 having wherein said silicone resin has a glass transition temperature of about 60° C. or above.

7. The composition according to claim 1 wherein said polyhydroxyl component comprises a polyphenolic resin.

8. The composition according to claim 7 wherein said polyphenolic component comprises a phenol novolac resin.

9. The composition according to claim 1 wherein said polyhydroxyl component comprises poly(hydroxylstyrene).

10. The composition according to claim 1 wherein said polyhydroxyl component has a number average molecular weight between about 400 and about 2000.

11. The coating powder according to claim 1 containing at least about 10 wt % of said polyhydroxyl component (B) based on total weight of (A) plus (B).

* * * * *